United States Patent
Yang

(10) Patent No.: US 9,781,679 B2
(45) Date of Patent: Oct. 3, 2017

(54) ELECTRONIC SYSTEMS AND METHOD OF OPERATING ELECTRONIC SYSTEMS

(71) Applicant: SAMSUNG ELECTRONICS CO., LTD., Suwon-Si, Gyeonggi-Do (KR)

(72) Inventor: Seung-Soo Yang, Hwaseong-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 15/354,520

(22) Filed: Nov. 17, 2016

(65) Prior Publication Data

US 2017/0156115 A1    Jun. 1, 2017

(30) Foreign Application Priority Data

Nov. 27, 2015 (KR) .................. 10-2015-0167983
Apr. 11, 2016 (KR) .................. 10-2016-0044071

(51) Int. Cl.
*H04W 52/02* (2009.01)
*H04W 88/02* (2009.01)

(52) U.S. Cl.
CPC ........ *H04W 52/0254* (2013.01); *H04W 88/02* (2013.01)

(58) Field of Classification Search
CPC .................. H04W 52/0254; H04W 88/02
USPC ............................ 455/574; 327/544
See application file for complete search history.

(56) References Cited

U.S. PATENT DOCUMENTS

| | | | | |
|---|---|---|---|---|
| 4,317,180 A * | 2/1982 | Lies | ............... | G06F 1/3215 326/97 |
| 5,541,929 A * | 7/1996 | Jokura | ............... | H03L 7/10 331/25 |
| 5,983,186 A * | 11/1999 | Miyazawa | ............... | G10L 15/26 704/233 |
| 6,304,598 B1 * | 10/2001 | Agazzi | ............... | H04B 3/487 375/232 |
| 6,418,067 B1 * | 7/2002 | Watanabe | ............... | G11C 11/4076 365/200 |
| 6,558,165 B1 | 5/2003 | Curry et al. | | |
| 6,562,001 B2 * | 5/2003 | Lebel | ............... | A61N 1/37211 604/65 |
| 6,571,128 B2 * | 5/2003 | Lebel | ............... | A61N 1/37211 607/32 |
| 6,577,899 B2 * | 6/2003 | Lebel | ............... | A61N 1/37211 128/903 |
| 6,648,821 B2 * | 11/2003 | Lebel | ............... | A61N 1/37211 128/903 |
| 6,762,638 B2 * | 7/2004 | Correale, Jr. | ............... | H03K 3/35625 327/202 |

(Continued)

*Primary Examiner* — Hai V Nguyen
(74) *Attorney, Agent, or Firm* — F. Chau & Associates, LLC

(57) ABSTRACT

An electronic system includes: a first device configured to generate an output signal in response to current input data and generate a power saving signal based on the current input data; a second device, and a controller. The output signal is perceivable using a physiological sense. The controller is configured to switch the electronic system into one of an inactive state and an active state, operate the second device during the active state in a power saving mode when the power saving signal is activated, and operate the second device during the active state in a normal power mode when the power saving signal is deactivated.

20 Claims, 12 Drawing Sheets

(56) References Cited

U.S. PATENT DOCUMENTS

| | | | | |
|---|---|---|---|---|
| 6,873,268 B2* | 3/2005 | Lebel | A61N 1/37211 | 340/870.16 |
| 6,898,238 B2* | 5/2005 | Agazzi | H04B 3/487 | 375/232 |
| 6,958,705 B2* | 10/2005 | Lebel | A61N 1/37211 | 340/870.07 |
| 6,974,437 B2* | 12/2005 | Lebel | A61N 1/37211 | 604/65 |
| 7,034,703 B2 | 4/2006 | Morris | | |
| 7,678,071 B2* | 3/2010 | Lebel | A61N 1/37211 | 600/300 |
| 7,679,939 B2* | 3/2010 | Gong | H02M 3/33507 | 363/21.15 |
| 7,830,685 B2* | 11/2010 | Wagner | H02M 3/285 | 363/17 |
| 7,831,310 B2* | 11/2010 | Lebel | A61N 1/37211 | 607/60 |
| 7,944,086 B2* | 5/2011 | Hodges | H02H 3/12 | 307/126 |
| 8,779,633 B2* | 7/2014 | Hodges | H02H 3/12 | 307/126 |
| 8,904,197 B2 | 12/2014 | Piersol et al. | | |
| 8,935,547 B2* | 1/2015 | Theocharous | G06F 1/3203 | 713/300 |
| 8,938,306 B2* | 1/2015 | Lebel | A61N 1/37211 | 607/60 |
| 8,941,262 B2* | 1/2015 | Arimoto | H02J 9/005 | 307/11 |
| 8,949,639 B2* | 2/2015 | Kamhi | G06F 1/3287 | 713/300 |
| 9,063,564 B2* | 6/2015 | Lombardi | G06F 3/01 | |
| 9,066,348 B2* | 6/2015 | Venkatachalam | H04W 76/046 | |
| 9,069,047 B2 | 6/2015 | Nallabelli et al. | | |
| 9,338,749 B2* | 5/2016 | Kim | H04W 52/0254 | |
| 9,533,096 B2* | 1/2017 | Lebel | A61M 5/172 | |
| 9,606,611 B2* | 3/2017 | Rennig | G06F 1/3243 | |
| 2001/0055335 A1* | 12/2001 | Agazzi | H04B 3/487 | 375/232 |
| 2002/0016568 A1* | 2/2002 | Lebel | A61M 5/14276 | 604/131 |
| 2002/0019606 A1* | 2/2002 | Lebel | A61N 1/37211 | 604/66 |
| 2002/0049480 A1* | 4/2002 | Lebel | A61N 1/37211 | 607/60 |
| 2002/0058906 A1* | 5/2002 | Lebel | A61N 1/37211 | 604/65 |
| 2002/0065454 A1* | 5/2002 | Lebel | A61N 1/37211 | 600/365 |
| 2002/0065509 A1* | 5/2002 | Lebel | A61N 1/37211 | 604/892.1 |
| 2002/0065540 A1* | 5/2002 | Lebel | A61N 1/37211 | 607/60 |
| 2003/0176933 A1* | 9/2003 | Lebel | A61N 1/37211 | 700/90 |
| 2004/0075478 A1* | 4/2004 | Correale, Jr. | H03K 3/35625 | 327/202 |
| 2004/0102816 A1* | 5/2004 | Mazar | A61N 1/37282 | 607/27 |
| 2005/0010269 A1* | 1/2005 | Lebel | A61N 1/37211 | 607/60 |
| 2006/0050731 A1* | 3/2006 | Thomas | G06F 13/4295 | 370/462 |
| 2007/0195559 A1* | 8/2007 | Gong | H02M 3/33507 | 363/21.01 |
| 2008/0096614 A1* | 4/2008 | Venkatachalam | H04W 76/046 | 455/574 |
| 2008/0118014 A1* | 5/2008 | Reunamaki | G06F 1/3209 | 375/356 |
| 2009/0295226 A1* | 12/2009 | Hodges | H02H 3/12 | 307/39 |
| 2011/0039508 A1* | 2/2011 | Lindahl | G06F 1/3203 | 455/230 |
| 2011/0103253 A1* | 5/2011 | Qi | H04L 27/2647 | 370/252 |
| 2011/0125095 A1* | 5/2011 | Lebel | A61N 1/37211 | 604/151 |
| 2011/0163976 A1* | 7/2011 | Barnhoefer | G06F 1/3203 | 345/173 |
| 2011/0181114 A1* | 7/2011 | Hodges | H02H 3/12 | 307/39 |
| 2011/0270045 A1* | 11/2011 | Lebel | A61N 1/37211 | 600/300 |
| 2012/0026532 A1* | 2/2012 | Arimoto | H02J 9/005 | 358/1.14 |
| 2012/0074782 A1* | 3/2012 | Hodges | H02H 3/12 | 307/39 |
| 2012/0074792 A1* | 3/2012 | Hodges | H02H 3/12 | 307/126 |
| 2012/0284543 A1* | 11/2012 | Xian | G06F 1/3206 | 713/320 |
| 2012/0315960 A1* | 12/2012 | Kim | H04W 52/0254 | 455/574 |
| 2013/0083714 A1* | 4/2013 | Joko | H04W 52/0206 | 370/311 |
| 2013/0219157 A1* | 8/2013 | Lee | G06F 1/3206 | 713/1 |
| 2014/0342670 A1* | 11/2014 | Kang | H04W 4/008 | 455/41.2 |
| 2014/0365225 A1* | 12/2014 | Haiut | G10L 15/22 | 704/275 |
| 2014/0366041 A1 | 12/2014 | Stanley-Marbell et al. | | |
| 2015/0009773 A1* | 1/2015 | Grunzke | G11O 5/147 | 365/230.08 |
| 2015/0057518 A1* | 2/2015 | Lebel | A61N 1/37211 | 600/365 |
| 2015/0160716 A1* | 6/2015 | Hiraoka | G06F 1/3253 | 713/320 |
| 2015/0192983 A1* | 7/2015 | Rennig | G06F 1/3209 | 713/323 |
| 2016/0124522 A1* | 5/2016 | Sumitomo | G06F 21/31 | 345/156 |
| 2017/0054839 A1* | 2/2017 | Ishikawa | H04W 52/0274 | |

* cited by examiner

ELECTRONIC SYSTEMS AND METHOD OF OPERATING ELECTRONIC SYSTEMS

CROSS-REFERENCE TO RELATED APPLICATION(S)

This application claims priority under 35 USC §119 to Korean Patent Application No. 10-2015-0167983, filed on Nov. 27, 2015, and Korean Patent Application No. 10-2016-0044071, filed on Apr. 11, 2016 in the Korean Intellectual Property Office (KIPO), the disclosure of each of are incorporated by reference in their entirety herein.

BACKGROUND

1. Technical Field

Exemplary embodiments of the inventive concept relate to an electronic system, and more particularly to a method of decreasing power consumption of an electronic system.

2. Discussion of Related Art

A mobile device is a small computing device, typically small enough to be handheld and including a display screen. A mobile device has an operating system and can run various types of application software, known as apps. Examples of mobile devices include smart phones, tablets, and a smart watches, etc.

Since a mobile device operates using a battery, it is important to decrease power consumption of the mobile device.

Therefore, a method of decreasing power consumption of a mobile device is required.

SUMMARY

According to an exemplary embodiment of the inventive concept, an electronic system includes: a first device configured to generate an output signal in response to current input data and generate a power saving signal based on the current input data; a second device, and a controller. The output signal is perceivable using a physiological sense. The controller is configured to switch the electronic system into one of an inactive state and an active state, operate the second device during the active state in a power saving mode when the power saving signal is activated, and operate the second device during the active state in a normal power mode when the power saving signal is deactivated.

According to an exemplary embodiment of the inventive concept, an electronic system includes a first device subsystem, a second device subsystem, and a controller. Each device of the first device subsystem is configured to generate an output signal in response to current input data and generate a first power saving signal based on the current input data. Each output signal is perceivable using a physiological sense. The controller is configured to switch the electronic system into one of an inactive state and an active state and operate the second device subsystem during the active state in one of a power saving mode and a normal power mode based on the first power saving signals.

According to an exemplary embodiment of the inventive concept, a method of operating an electronic device includes: determining, by a controller of the electronic system, whether an operating mode of the electronic system is in one of an active state and an inactive state; and upon determined the operating mode is in the active state, generating, by a first device of the electronic system, an output signal perceivable using a physiological sense; outputting, by the first device, a power saving signal to a controller of the electronic system; operating, by the controller, a second device of the electronic system in a power saving mode when the power saving signal is activated; and operating, by the controller, the second device in a normal power mode when the power saving signal is deactivated.

BRIEF DESCRIPTION OF THE DRAWINGS

Hereinafter, exemplary embodiments of the inventive concept in conjunction with the accompanying drawings will be described. Below, detailed configurations and structures are provided to aid a reader in understanding embodiments of the inventive concept. However, embodiments described herein may be variously changed or modified without departing from embodiments of the inventive concept. Modules in the drawings or the following detailed description may be connected with other modules in addition to the components described in the detailed description or illustrated in the drawings. Each connection between the modules or components may be a connection by communication or may be a physical connection.

DETAILED DESCRIPTION OF THE EMBODIMENTS

Figure 1:
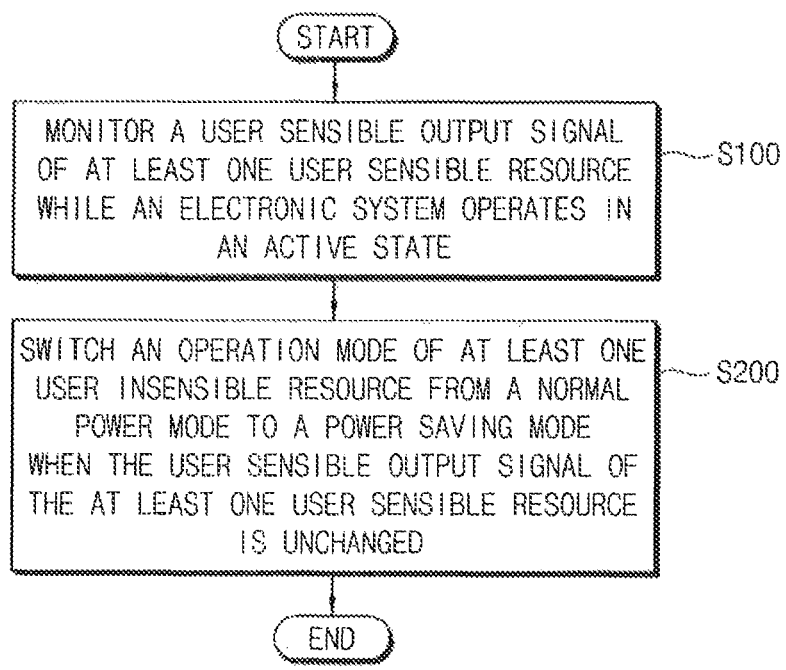
FIG. 1 is a flow chart illustrating a method of operating an electronic system according to an exemplary embodiment of the inventive concept.

FIG. 1 is a flow chart illustrating a method of operating an electronic system according to an exemplary embodiment of the inventive concept.

In FIG. 1, a method of operating an electronic system including at least one user sensible resource generating a user sensible output signal and at least one user insensible resource generating a user insensible output signal is illustrated.

A user sensible resource represents a device which generates an output signal that a user is able to sense. For example, a user is able to sense the output signal using a physiological sense such as the sense of sight, the sense of hearing, or the sense of touch. For example, the at least one user sensible resource may include at least one of a display device, which generates an image signal that a user is able to sense using the sense of sight, an audio device, which generates an audio signal that a user is able to sense using the sense of hearing, and a vibration device, which generates a vibration signal that a user is able to sense using the sense of touch.

Examples of the display device include an image processor or a graphic processing unit (GPU) that are configured to generate image signals for output to a display panel. Examples of the audio device include an audio processor configured to generate audible signals for output to a speaker. Examples of the vibration device include an electric motor with an eccentrically mounted weight on a shaft of the motor. The vibration device can apply a driving signal to the motor to cause the motor to spin. When the motor spins, the weight causes the electronic system it is housed within to vibrate.

A user insensible resource represents a device which generates an output signal that a user is unable to sense using a physiological sense such as the sense of sight, the sense of hearing, or the sense of touch. For example, the at least one user insensible resource may include at least one of a central processing unit (CPU), a memory device, and a touch screen device.

The electronic system performs normal operations when the electronic system is in an active state. For example, these normal operations may be performed by one or more central processing units of the electronic system. In an exemplary embodiment, when the electronic system has not performed an input operation and an output operation during a threshold period of time in the active state, the electronic system switches from the active state to an inactive state. In an exemplary embodiment, when the electronic system has been idle for the threshold period of time in the active state, the electronic system switches from the active state to the inactive state. The electronic system may switch an internal central processing unit (CPU) from an active mode to a sleep mode and turn off a display device of the electronic system in the inactive state to decrease power consumption of the electronic system. In an embodiment, the CPU performs fewer functions in the sleep mode as compared to the active mode.

In FIG. 1, a method of operating an electronic system to decrease the power consumption of the electronic system in the active state is illustrated.

Referring to FIG. 1, while the electronic system operates in the active state, the electronic system monitors a user sensible output signal of at least one user sensible resource (step S100). In an exemplary embodiment, the electronic system monitors the user sensible output signal of the at least one user sensible resource to determine whether the user sensible output signal of the at least one user sensible resource changes.

When the user sensible output signal of the at least one user sensible resource is unchanged, the electronic system switches an operation mode of the at least one user insensible resource from a normal power mode to a power saving mode (step S200).

In an exemplary embodiment of the inventive concept, the electronic system switches the operation mode of the at least one user insensible resource from the normal power mode to the power saving mode when a reference time period passes from a time at which the at least one user sensible resource stops generating the user sensible output signal. For example, if one of the user sensible resources corresponds to an audio device, the electronic system switches the operation mode of the audio device from the normal power mode to the power saving mode when the reference time period passes from a time at which the audio device stops generating an audio signal.

In an exemplary embodiment, the electronic system switches the operation mode of the at least one user insensible resource from the normal power mode to the power saving mode when the user sensible output signal of the at least one user sensible resource is maintained without a change during the reference time period. For example, if one of the user sensible resources corresponds to a display device (e.g., a GPU), the electronic system switches the operation mode of the display device from the normal power mode to the power saving mode when the display device outputs a still image signal during the reference time period.

Here, the power saving mode is different from the inactive state of the electronic system. In the active state, the electronic system may operate either in the normal power mode or in the power saving mode based on whether the user sensible output signal of the at least one user sensible resource changes. For example, the electronic system typically uses less power in the power saving mode of the active state than the normal power mode of the active state, and even less power in the inactive state.

In an exemplary embodiment, the operation speed of a user insensible resource is decreased when the user insensible resource is switched from the normal power mode to the power saving mode, thereby reducing power consumption.

In an exemplary embodiment, a user insensible resource periodically performs a polling operation in the normal power mode, but stops performing the polling operation in the power saving mode. For example, if the user insensible resource is a sensor designed to sense touches of a touch screen, and the sensor senses these touches by polling read lines of the touch screen for these touches, the sensor would perform this polling in the normal power mode and not perform this polling in the power saving mode.

In an exemplary embodiment, a user insensible resource periodically performs a polling operation at a first frequency in the normal power mode, and the user insensible resource periodically performs the polling operation with at a second frequency in the power saving mode, where the first frequency is higher than the second frequency. If the user insensible resource performs a first polling operation at time 1 and a second polling operation at time 2 while in the normal power mode, the time period between time 1 and time 2 is a first period. If the user insensible resource performs a third polling operation at time 3 and a fourth polling operation at time 4 while in the power saving mode, the time period between time 3 and time 4 is a second period.

In this example, the second period is longer than the first period because the period between polling operations increases in the power saving mode.

Therefore, when the electronic system operates in the power saving mode in the active state, the power consumption of the electronic system may decrease.

In an exemplary embodiment of the inventive concept, the at least one user sensible resource adjusts a length of the reference time period based on a power control signal. As the length of the reference time period decreases, the power consumption of the electronic system in the active state may decrease. The electronic system may be more likely to enter the power saving mode when a lower reference time period is used.

A dynamic voltage and frequency scaling (DVFS) method could be used to decrease power consumption of an electronic system in an active state. However, the DVFS method requires an operation of monitoring task loads of a central processing unit and a memory device. Since additional power is consumed in the operation of monitoring task loads of the central processing unit and the memory device, the efficiency of a power consumption reduction of the electronic system may be degraded when the DVFS method is applied during the active state.

However, in a method of operating an electronic system according to an exemplary embodiment of the inventive concept, the electronic system switches the operation mode of at least one user insensible resource, such as a central processing unit or a memory device from the normal power mode to the power saving mode when the user sensible output signal of the at least one user sensible resource is unchanged during the reference time period in the active state. Therefore, a method of operating an electronic system according to at least one exemplary embodiment may effectively decrease the power consumption in the active state while the user is unable to notice a decrease in operation speed of the electronic system.

Figure 2:
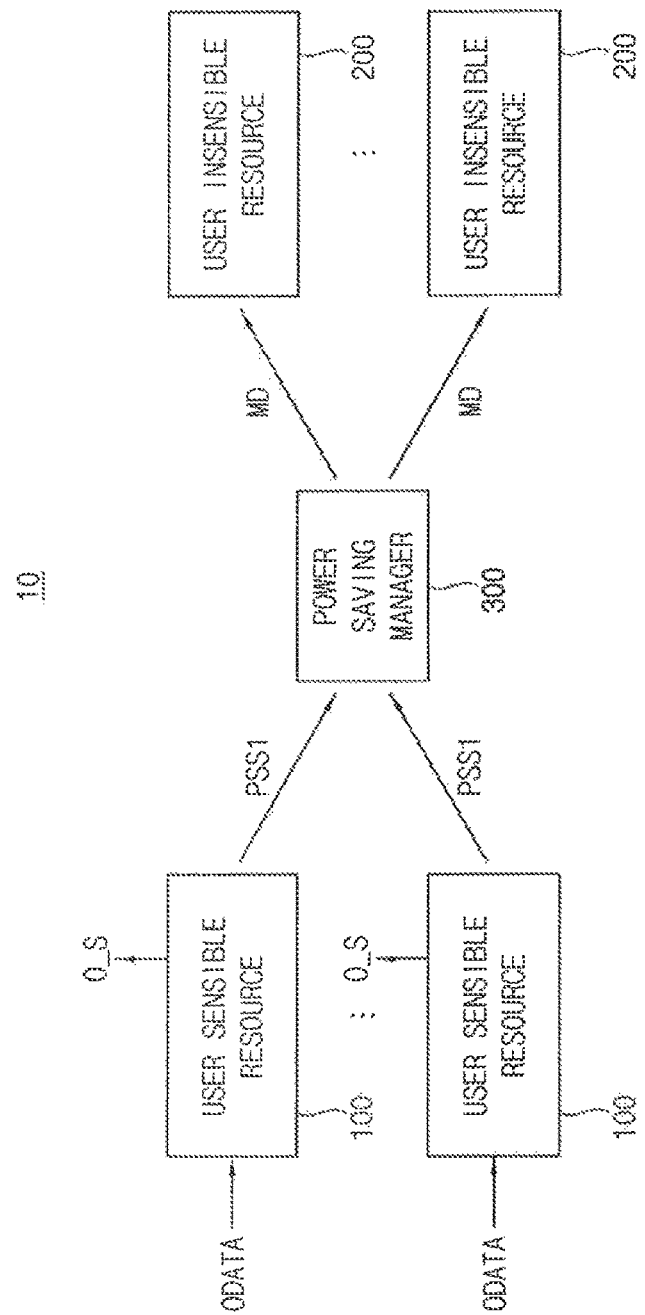
FIG. 2 is a block diagram illustrating an electronic system according to an exemplary embodiment of the inventive concept.

FIG. 2 is a block diagram illustrating an electronic system according to an exemplary embodiment of the inventive concept.

The method of operating an electronic system of FIG. 1 may be performed by an electronic system 10 of FIG. 2.

Referring to FIG. 2, the electronic system 10 includes at least one user sensible resource 100, at least one user insensible resource 200, and a power saving manager 300. The power saving manager 300 may be implemented by a controller circuit (e.g., a controller) or one or more logic circuits.

The electronic system 10 may perform one or more normal operations in an active state. In an embodiment, the electronic system 10 switches to an inactive state when the electronic system 10 does not perform an input operation and an output operation or is idle during a threshold time period in the active state.

In an embodiment, the at least one user insensible resource 200 generates a user insensible output signal that the user is unable to sense. For example, a user is unable to sense the user insensible output signal using a physiological sense such as sight, hearing, or touch.

The at least one user insensible resource 200 may include at least one of a central processing unit (CPU), a memory device, and a touch screen device.

When the at least one user sensible resource 100 receives output data ODATA in the active state, the at least one user sensible resource 100 may generate a user sensible output signal O_S based on the output data ODATA and deactivate a first power saving signal PSS1. For example, a user sensible resource may output a deactivated first power saving signal PSS1 when the current output data ODATA differs from the previous output ODATA, so that the power saving manager 300 knows that that user sensible resource is not recommending the power saving mode.

In an exemplary embodiment, when a reception of the output data ODATA is stopped in the active state, the at least one user sensible resource 100 activates the first power saving signal PSS1. In an exemplary embodiment, the at least one user sensible resource 100 activates the first power saving signal PSS1 when a reference time period passes from a time at which the reception of the output data ODATA is stopped. For example, if the reference time period is 0.5 seconds, the user sensible resource receives current output data ODATA at time 1.0 seconds, and the user sensible resource has not received subsequent output ODATA by time 1.5 seconds, then the user sensible resource outputs an activated first power saving signal PSS1 to the power saving manager 300. In an embodiment, the at least one user sensible resource 100 activates the first power saving signal PSS1 when the current output data ODATA is the same as the subsequent output data ODATA. For example, the current output data ODATA being the same as the subsequent output data ODATA could indicate that the user sensible resource is outputting a still image.

In an exemplary embodiment, when a reception of the output data ODATA has stopped in the active state, the at least one user sensible resource 100 stops generating the user sensible output signal O_S or generates the user sensible output signal O_S having a constant magnitude corresponding to the output data ODATA which is received most recently. For example, if the user sensible resource had output an audio signal based on first audio data received at time 1, and second audio data has not been received by time 2, the user sensible resource outputs no audio signal. For example, if the user sensible resource had output an image signal based on first image data at time 1, and no second image data has been received by time 2, the user sensible resource re-outputs the same image signal.

The power saving manager 300 may receive the first power saving signal PSS1 from the at least one user sensible resource 100. The power saving manager 300 may set the operation mode of the at least one user insensible resource 200 by providing a mode signal MD to the at least one user insensible resource 200 based on the first power saving signal PSS1. For example, the power saving manager 300 may provide the mode signal MD having a first logic level to the at least one user insensible resource 200 when the first power saving signal PSS1 is deactivated, and provide the mode signal MD having a second logic level to the at least one user insensible resource 200 when the first power saving signal PSS1 is activated.

The at least one user insensible resource 200 may operate in the normal power mode when the mode signal MD has the first logic level, and switch the operation mode from the normal power mode to the power saving mode when the mode signal MD transitions from the first logic level to the second logic level.

In an exemplary embodiment, the power saving manager 300 transitions the mode signal MD from the first logic level to the second logic level to switch the operation mode of the at least one user insensible resource 200 from the normal power mode to the power saving mode when all of the first power saving signal PSS1 received from the at least one user sensible resource 100 are activated.

In an exemplary embodiment, the power saving manager 300 transitions the mode signal MD from the first logic level to the second logic level to switch the operation mode of the at least one user insensible resource 200 from the normal power mode to the power saving mode when at least one of the first power saving signal PSS1 received from the at least one user sensible resource 100 is activated.

The at least one user insensible resource 200 may decrease an operation speed to reduce the power consumption when switching from the normal power mode to the power saving mode. For example, a user insensible resource 200 may decrease an operating frequency of one of its CPUs when it is switched to the power saving mode.

In an exemplary embodiment, the at least one user insensible resource 200 periodically performs a polling operation in the normal power mode, and stops performing the polling operation in the power saving mode.

In an exemplary embodiment, the at least one user insensible resource 200 periodically performs a polling operation at a first frequency in the normal power mode, and periodically performs the polling operation at a second frequency in the power saving mode, where the first frequency is higher than the second frequency. Thus, the period between consecutive polling operations performed in the power saving mode is larger than the period between consecutive polling operations in the normal power mode.

As described above, since the at least one user sensible resource 100 stops generating the user sensible output signal O_S or generates the user sensible output signal O_S having a constant magnitude in the power saving mode, the user may not notice a decrease in operation speed of the electronic system 10 even though an operation speed of the at least one user insensible resource 200 is decreased in the power saving mode. Therefore, the electronic system 10 according to at least one embodiment of the inventive concept may effectively decrease the power consumption in the active state while the user is unable to notice a decrease in operation speed of the electronic system 10.

Figure 3:
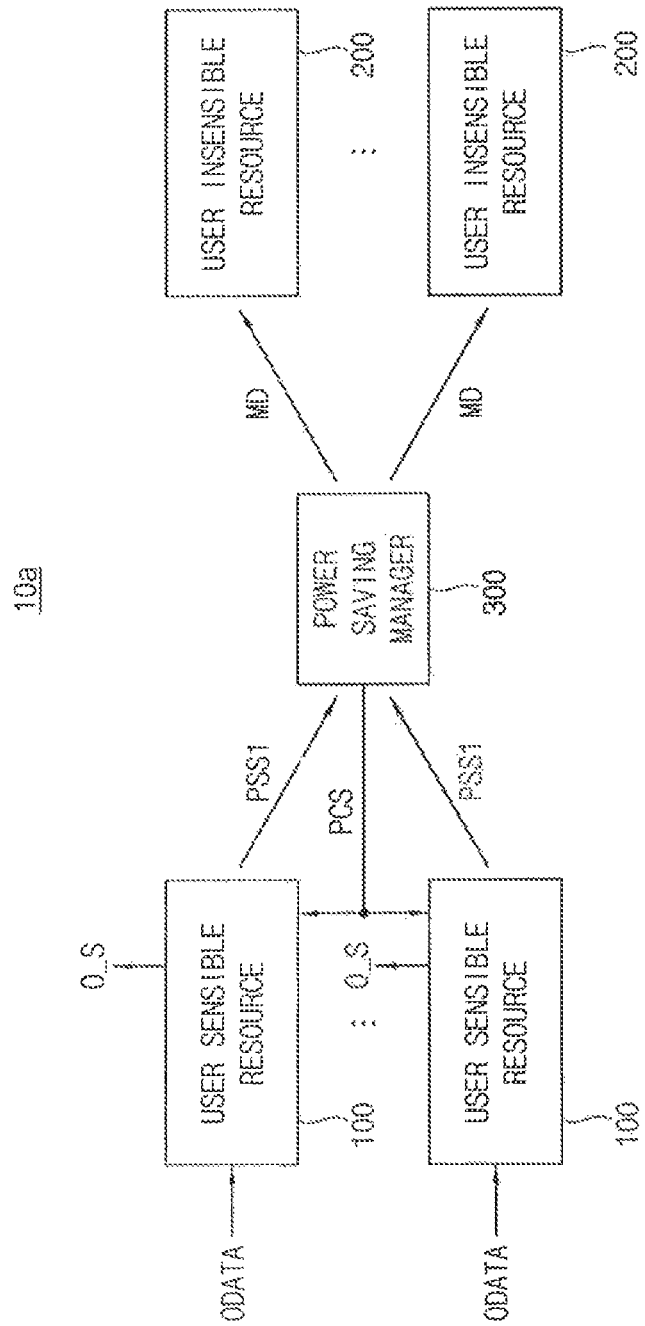
FIG. 3 is a block diagram illustrating an example of the electronic system of FIG. 2.

FIG. 3 is a block diagram illustrating an example of the electronic system of FIG. 2.

An electronic system 10*a* of FIG. 3 is the same as the electronic system 10 of FIG. 2 except that the power saving manager 300 generates a power control signal PCS in the electronic system 10*a* of FIG. 3.

Referring to FIG. 3, the power saving manager 300 may provide the power control signal PCS to the at least one user sensible resource 100.

As described above with reference to FIG. 2, the at least one user sensible resource 100 may activate the first power saving signal PSS1 when the reference time period passes from a time at which the reception of the output data ODATA is stopped in the active state.

In this case, the power saving manager 300 may generate the power control signal PCS based on a task load that occurred due to a mode change between the normal power mode and the power saving mode and/or a remaining battery level, and the at least one user sensible resource 100 may adjust a length of the reference time period based on the power control signal PCS. In an embodiment, the power control signal PCS indicates the length of the reference time period. In an embodiment, the power saving manager 300 decreases the length of the reference time period when the task load is lower than a threshold (i.e., when task load is low) and increases the length of the reference time period when the task load is higher than a threshold (i.e., when the task load is high). In an embodiment, the power saving manager 300 decreases the length of the reference time period when the remaining battery level is lower than a threshold (i.e., when the remaining battery level is low) and increases the length of the reference time period when the remaining battery level is higher than a threshold (i.e., when the remaining battery level is high).

Although FIG. 3 illustrates that the power saving manager 300 provides the power control signal PCS to the at least one user sensible resource 100, embodiments of the inventive concept are not limited thereto. According to an exemplary embodiment of the inventive concept, a central processing unit included in the electronic system 10*a* provides the power control signal PCS to the at least one user sensible resource 100.

Figure 4:
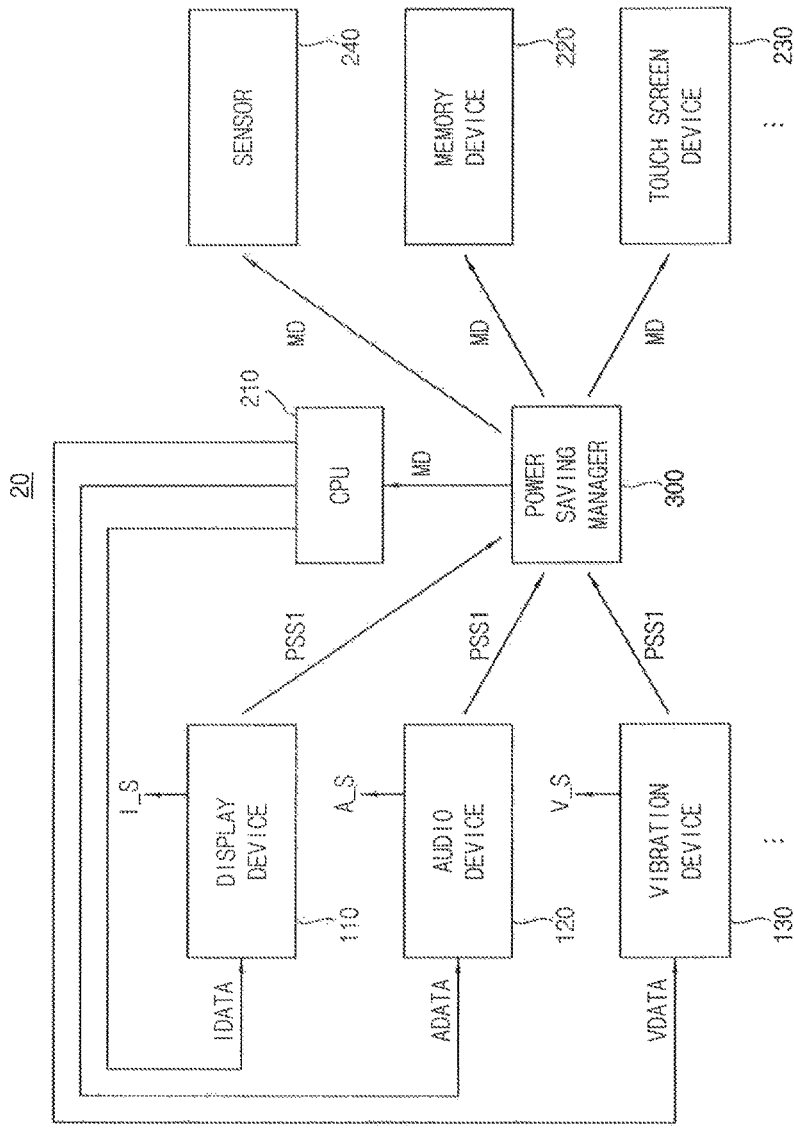
FIG. 4 is a block diagram illustrating an electronic system according to an exemplary embodiment of the inventive concept.

FIG. 4 is a block diagram illustrating an electronic system according to an exemplary embodiment of the inventive concept.

An electronic system 20 of FIG. 4 corresponds to an example of the electronic system 10 of FIG. 2.

The method of operating an electronic system of FIG. 1 may be performed by the electronic system 20 of FIG. 4.

Referring to FIG. 4, the electronic system 20 includes a display device 110, an audio device 120, a vibration device 130, a central processing unit (CPU) 210, a memory device 220, a touch screen device 230, a sensor 240, and a power saving manager 300. In an embodiment, the display device 110 is a graphics processor (e.g., GPU) or a timing controller configured to generate image signals from received image data (e.g., IDATA) and provide the image signals to a data driver (not shown), and the data driver is configured to provide the image signals (e.g., I_S) to a display panel of a mobile device. In an embodiment, the audio device 120 is an audio processor configured to generate audio signals (e.g., A_S) based on received audio data (e.g., ADATA) and provide those audio signals to a speaker (not shown) of the mobile device. In an embodiment, the vibration device 130 includes a motor with a weight (not shown) attached to a shaft of the motor, and the motor spins in response to a received motor driving signal (e.g., VDATA) to produce a vibration (e.g., V_S) within a mobile device.

In the active state, the central processing unit 210 may provide image data IDATA to the display device 110, and the display device 110 may generate an image signal I_S, which is sensible by the user, based on the image data IDATA. For example, an image may be presented on a display panel of a mobile device when the image signal I_S is applied to the display panel and the user can use the sense of sight to view the image.

In the active state, the central processing unit 210 may provide an audio data ADATA to the audio device 120, and the audio device 120 may generate an audio signal A_S, which is sensible by the user, based on the audio data ADATA. For example, a mobile device may emit music or sounds when the audio signal A_S is applied to a speaker of the mobile device and the user can use the sense of hearing to hear the music or sounds.

In the active state, the central processing unit 210 may provide vibration data VDATA to the vibration device 130, and the vibration device 130 may generate a vibration signal V_S, which is sensible by the user, based on the vibration data VDATA. For example, a user may use the sense of touch to feel a vibration in the mobile device caused by the vibration signal V_S.

In an exemplary embodiment, a single controller includes the CPU 210 and the power saving manager 300 or just the power saving manager 300.

Therefore, each of the display device 110, the audio device 120, and the vibration device 130 included in the electronic system 20 of FIG. 4 may correspond to the at least one user sensible resource 100 included in the electronic system 10 of FIG. 2.

Since each of the central processing unit 210, the memory device 220, the touch screen device 230, and the sensor 240 included in the electronic system 20 of FIG. 4 generates an output signal which is insensible by the user, each of the central processing unit 210, the memory device 220, the touch screen device 230, and the sensor 240 may correspond to the at least one user insensible resource 200 included in the electronic system 10 of FIG. 2. For example, the output signals generated by central processing unit 210, the memory device 220, the touch screen device 230, and the sensor 240 are typically not perceivable by a human using the sense of sight, hearing, or touch.

Although FIG. 4 illustrates that the electronic system 20 includes the display device 110, the audio device 120, and the vibration device 130 as the at least one user sensible resource 100, exemplary embodiments of the inventive concept are not limited thereto. According to an exemplary embodiment of the inventive concept, the electronic system 20 includes only some of the display device 110, the audio device 120, and the vibration device 130 as the at least one user sensible resource 100 (e.g., one or more of devices 110-130 is omitted) or further includes other devices except for the display device 110, the audio device 120, and the vibration device 130 as the at least one user sensible resource 100.

Similarly, although FIG. 4 illustrates that the electronic system 20 includes the central processing unit 210, the memory device 220, the touch screen device 230, and the sensor 240 as the at least one user insensible resource 200, exemplary embodiments of the inventive concept are not limited thereto. According to an exemplary embodiment of the inventive concept, the electronic system 20 includes only some of the central processing unit 210, the memory device 220, the touch screen device 230, and the sensor 240 as the at least one user insensible resource 200 (e.g., one or more of devices 210-240 are omitted) or further includes other devices except for the central processing unit 210, the memory device 220, the touch screen device 230, and the sensor 240 as the at least one user insensible resource 200.

Figure 5:
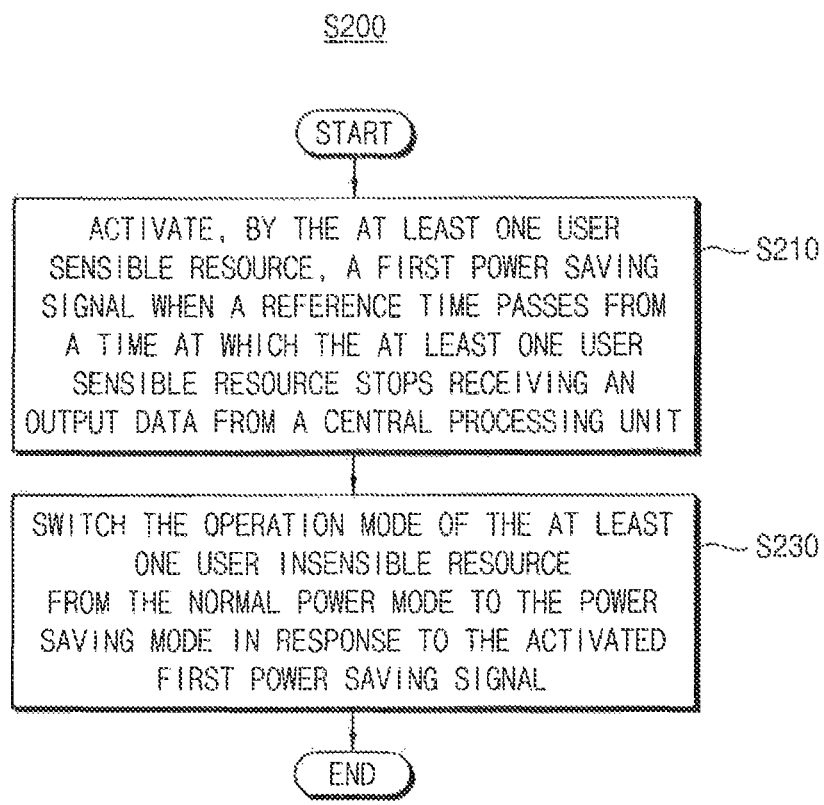
FIG. 5 is a flow chart illustrating an example of a process of switching an operation mode of at least one user insensible resource from a normal power mode to a power saving mode when a user sensible output signal of at least one user sensible resource is unchanged that may be included in the method of operating the electronic system of FIG. 1.

FIG. 5 is a flow chart illustrating an example of a process of switching an operation mode of at least one user insensible resource from a normal power mode to a power saving mode when a user sensible output signal of at least one user sensible resource is unchanged that may be included in the method of operating the electronic system of FIG. 1.

Referring to FIGS. 4 and 5, the at least one user sensible resource 110, 120, and 130 activates the first power saving signal PSS1 when a reference time period passes from a time at which the at least one user sensible resource 110, 120, and 130 stops receiving the output data IDATA, ADATA, and VDATA from the central processing unit 210 in the active state (step S210).

For example, the display device 110 may activate the first power saving signal PSS1 when the reference time period passes from a time at which the display device 110 stops receiving the image data IDATA from the central processing unit 210 in the active state.

Similarly, the audio device 120 may activate the first power saving signal PSS1 when the reference time period passes from a time at which the audio device 120 stops receiving the audio data ADATA from the central processing unit 210 in the active state.

Similarly, the vibration device 130 may activate the first power saving signal PSS1 when the reference time period passes from a time at which the vibration device 130 stops receiving the vibration data VDATA from the central processing unit 210 in the active state.

In an exemplary embodiment, the display device 110, the audio device 120, and the vibration device 130 adjust a length of the reference time period based on the power control signal PCS provided by the power saving manager 300.

The power saving manager 300 may provide the mode signal MD having the second logic level to the at least one user insensible resource 210, 220, 230, and 240 in response to the activated first power saving signal PSS1 to switch the operation mode of the at least one user insensible resource 210, 220, 230, and 240 from the normal power mode to the power saving mode (step S230).

In an exemplary embodiment, the power saving manager 300 provides the mode signal MD having the second logic level to the central processing unit 210, the memory device 220, the touch screen device 230, and the sensor 240 to switch the operation mode of the central processing unit 210, the memory device 220, the touch screen device 230, and the sensor 240 from the normal power mode to the power saving mode when all of the first power saving signals PSS1 received from the display device 110, the audio device 120, and the vibration device 130 are activated.

In an exemplary embodiment, the power saving manager 300 provides the mode signal MD having the second logic level to the central processing unit 210, the memory device 220, the touch screen device 230, and the sensor 240 to switch the operation mode of the central processing unit 210, the memory device 220, the touch screen device 230, and the sensor 240 from the normal power mode to the power saving mode when at least one of the first power saving signals PSS1 received from the display device 110, the audio device 120, and the vibration device 130 is activated.

Figure 6:
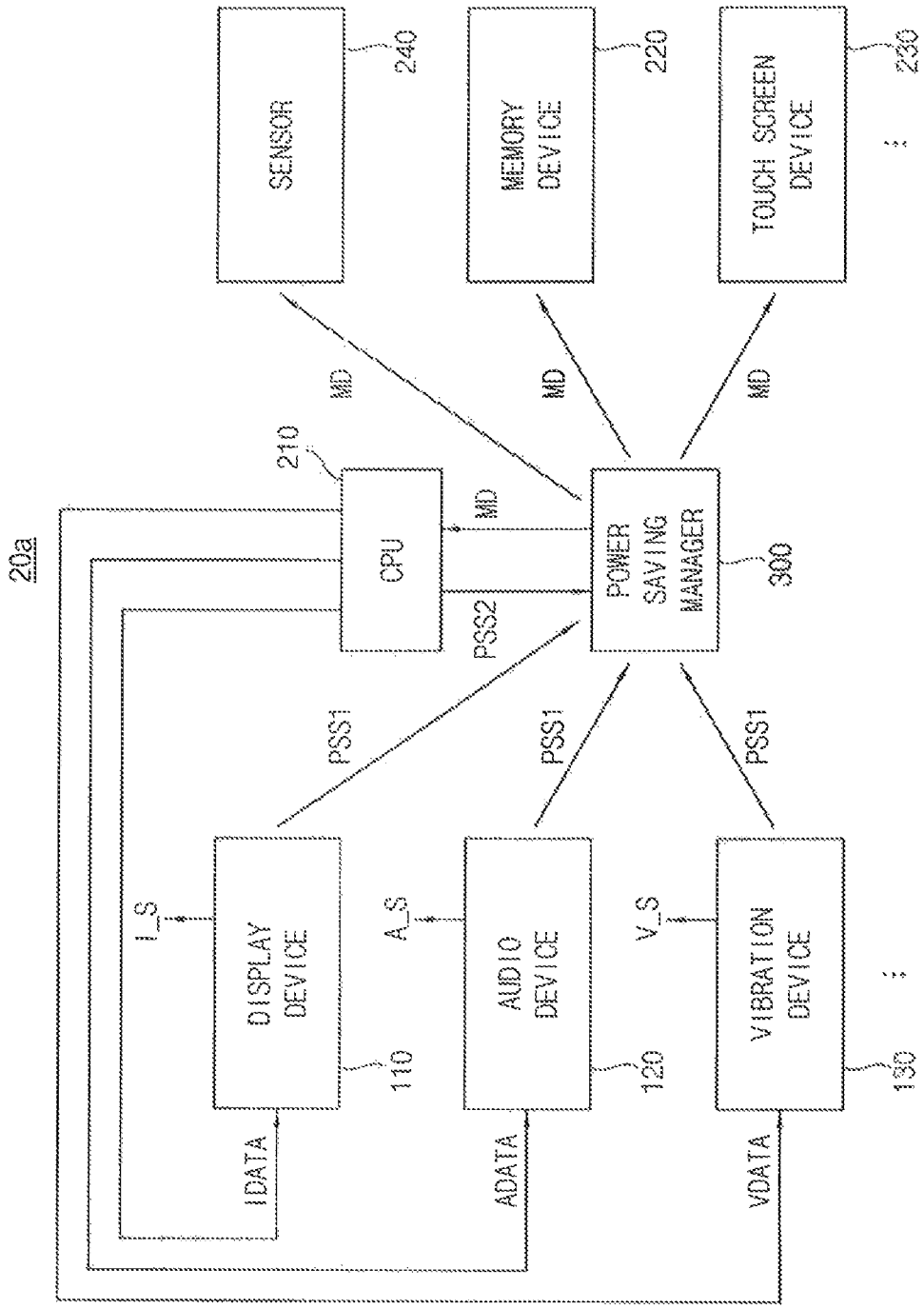
FIG. 6 is a block diagram illustrating an example of the electronic system of FIG. 4.
Figure 7:
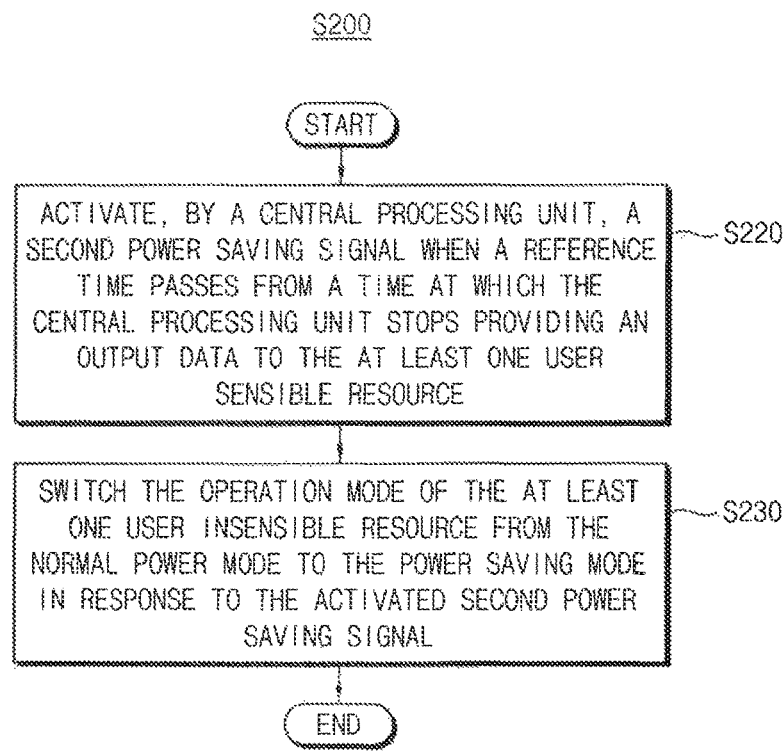
FIG. 7 is a flow chart illustrating an example of a process of switching an operation mode of at least one user insensible resource from a normal power mode to a power saving mode when a user sensible output signal of at least one user sensible resource is unchanged that may be included in the method of operating the electronic system of FIG. 1.

FIG. 6 is a block diagram illustrating an example of the electronic system of FIG. 4, and FIG. 7 is a flow chart illustrating another example of a process of switching an operation mode of at least one user insensible resource from a normal power mode to a power saving mode when a user sensible output signal of at least one user sensible resource is unchanged that may be included in the method of operating the electronic system of FIG. 1.

An electronic system 20a of FIG. 6 is the same as the electronic system 20 of FIG. 4 except that the central processing unit 210 generates a second power saving signal PSS2 in the electronic system 20a of FIG. 6.

Referring to FIG. 6, the central processing unit 210 deactivates the second power saving signal PSS2 when the central processing unit 210 provides the output data IDATA, ADATA, and VDATA to the at least one user sensible resource 110, 120, and 130 in the active state. Referring to FIGS. 6 and 7, the central processing unit 210 activates the second power saving signal PSS2 when a reference time period passes from a time at which the central processing unit 210 stops providing the output data IDATA, ADATA, and VDATA to the at least one user sensible resource 110, 120, and 130 in the active state (step S220).

For example, the central processing unit 210 may activate the second power saving signal PSS2 when the reference time period passes from a time at which the central processing unit 210 stops providing the image data IDATA to the display device 110 in the active state.

Similarly, the central processing unit 210 may activate the second power saving signal PSS2 when the reference time period passes from a time at which the central processing unit 210 stops providing the audio data ADATA to the audio device 120 in the active state.

Similarly, the central processing unit 210 may activate the second power saving signal PSS2 when the reference time period passes from a time at which the central processing unit 210 stops providing the vibration data VDATA to the vibration device 130 in the active state.

In an exemplary embodiment, the central processing unit 210 adjusts a length of the reference time period based on the power control signal PCS provided by the power saving manager 300.

According to an exemplary embodiment of the inventive concept, the central processing unit 210 activates the second power saving signal PSS2 when the reference time period passes from a time at which the central processing unit 210 stops providing all of the image data IDATA, the audio data ADATA, and the vibration data VDATA to the display device 110, the audio device 120, and the vibration device 130, respectively, in the active state.

The power saving manager switches the operation mode of the at least one user insensible resource 210, 220, 230, and 240 from the normal power mode to the power saving mode in response to the activated second power saving signal PSS2 (step S230). The power saving manager 300 may provide the mode signal MD having the second logic level to the at least one user insensible resource 210, 220, 230, and 240 to perform this switch.

In an exemplary embodiment, the power saving manager 300 provides the mode signal MD having the second logic level to the at least one user insensible resource 210, 220, 230, and 240 to switch the operation mode of the at least one user insensible resource 210, 220, 230, and 240 from the normal power mode to the power saving mode when at least one of the first power saving signal PSS1 and the second power saving signal PSS2 is activated.

The central processing unit 210, the memory device 220, the touch screen device 230, and the sensor 240, which correspond to the at least one user insensible resource 200, may operate in the normal power mode when the mode signal MD having the first logic level is received from the power saving manager 300, and operate in the power saving mode when the mode signal MD having the second logic level is received from the power saving manager 300.

In an exemplary embodiment, the central processing unit 210 periodically performs a polling operation in the normal power mode to adjust operation parameters of the electronic system 20 based on a change of an operation environment. For example, the central processing unit 210 may perform a polling operation to adjust a timing parameter of the memory device 220 based on a temperature. In an exemplary embodiment, the central processing unit 210 stops performing the polling operation in the power saving mode.

In an exemplary embodiment, the central processing unit 210 periodically performs the polling operation at a first frequency in the normal power mode, and periodically performs the polling operation at a second frequency in the power saving mode, where the first frequency is higher than the second frequency. For example, the period between consecutive polling operations/samples during the power saving mode is larger than the period between consecutive polling operations/samples during the normal power mode.

In an exemplary embodiment, the central processing unit 210 operates in synchronization with a first frequency in the normal power mode, and operates in synchronization with a second frequency smaller than the first frequency in the power saving mode. For example, the operating frequency of the central processing unit 210 may be higher in the normal power mode than the power saving mode.

In an exemplary embodiment, the central processing unit 210 includes a plurality of cores. In this case, the central processing unit 210 may turn off at least one of the plurality of cores in the power saving mode, which is turned on in the normal power mode. For example, if all the cores are turned on in the normal power mode, then one or more of the remaining cores may be turned off during the power saving mode.

In an exemplary embodiment, the memory device 220 operates according to an open page policy in the normal power mode. The open page policy represents a memory operation policy in which one of a plurality of pages included in the memory device 220 is accessed, and then the accessed page is maintained in an open state without being closed. When the memory device 220 operates according to the open page policy, power consumption of the memory device 220 may increase since the accessed page is required to be maintained in the open state. However, when the accessed page is accessed again the next time while the memory device 220 operates according to the open page policy, an operation speed of the memory device 220 may increase since the accessed page is not required to be opened again. In an exemplary embodiment, in the open page policy, when one row of the memory device 220 is accessed, a sense amplifier (not shown) of the memory device 220 is maintained in a charged state until another row is accessed. Therefore, if a locality of the memory access is high, a latency of the memory device may decrease. However, since the sense amplifier is maintained in the charged state, power consumption may increase under the open page policy.

In an exemplary embodiment, the memory device 220 operates according to a closed page policy in the power saving mode. The closed page policy represents a memory operation policy in which after one of the plurality of pages included in the memory device 220 is accessed, the accessed page is always closed immediately. For example, closing of the accessed page may mean that a supply voltage is no longer supplied to the sense amplifier. When the memory device 220 operates according to the closed page policy, an operation speed of the memory device 220 may decrease since a corresponding page is required to be opened in every access to the memory device 220. However, when the memory device 220 operates according to the closed page policy, power consumption of the memory device 220 may decrease since the accessed page is not required to be maintained in the open state.

Figure 8:
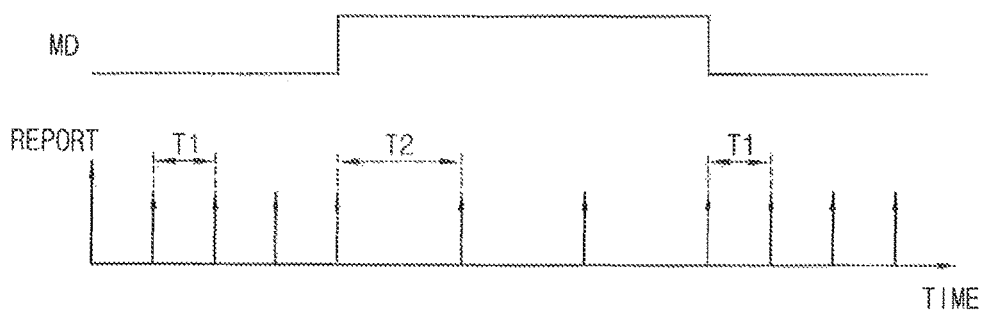
FIG. 8 is a diagram for describing an operation of a touch screen device included in the electronic system of FIGS. 4 and 6.

FIG. 8 is a diagram for describing an operation of a touch screen device included in the electronic system of FIGS. 4 and 6.

As illustrated in FIG. 8, the touch screen device 230 periodically provides a touch sensing result to the central processing unit 210. For example, each up arrow in FIG. 8 may represent a new touch sensing result or a polling operation performed to generate the result.

In an exemplary embodiment, the touch screen device 230 periodically provides the touch sensing result to the central processing unit 210 in the normal power mode in which the mode signal MD has the first logic level, and periodically provides the touch sensing result to the central processing unit 210 in the power saving mode in which the mode signal MD has the second logic level. In an embodiment, a first period T1 between a consecutive pair of touch sensing results provided by the touch screen device 230 during the normal power mode is less or shorter than a second period T2 between a consecutive pair of touch sensing results provided by the touch screen device 230 during the power saving mode. In an embodiment, a first period T1 between consecutive polling operations performed by the touch screen device 230 to sense touches of a touch screen during the normal power mode is less or shorter than a second period T2 between the consecutive polling operations performed by the touch screen device 230 during the power saving mode.

Referring again to FIG. 7, similar to the touch screen device 230, the sensor 240, which corresponds to the user insensible resource 200, may also periodically provide a sensing result to the central processing unit 210. For example, the sensor 240 may include an acceleration sensor (e.g., an accelerometer), a geomagnetic sensor, a gyroscope, etc. For example, the sensing result may indicate a particular orientation, coordinate acceleration, and vibration of a mobile device.

In an exemplary embodiment, the sensor 240 periodically provides the sensing result to the central processing unit 210 at a third frequency in the normal power mode in which the mode signal MD has the first logic level, and periodically provides the sensing result to the central processing unit 210 at a fourth frequency in the power saving mode in which the mode signal MD has the second logic level, where the third frequency is higher than the second frequency. In an embodiment, a third period between a consecutive pair of sensing results provided by the sensor 240 during the normal power mode is less or shorter than a fourth period between a consecutive pair of sensing results provided by the sensor 240 during the power saving mode. In an embodiment, a third period between a consecutive polling operations performed by the sensor 240 to generate sensing results during the normal power mode is less or shorter than a fourth period between the consecutive polling operations performed by the sensor 240 during the power saving mode.

As described above, when the at least one user insensible resource 200, such as the central processing unit 210, the memory device 220, the touch screen device 230, and the sensor 240, is switched from the normal power mode to the power saving mode, the at least one user insensible resource 200 may decrease an operation speed to reduce the power consumption.

Figure 9:
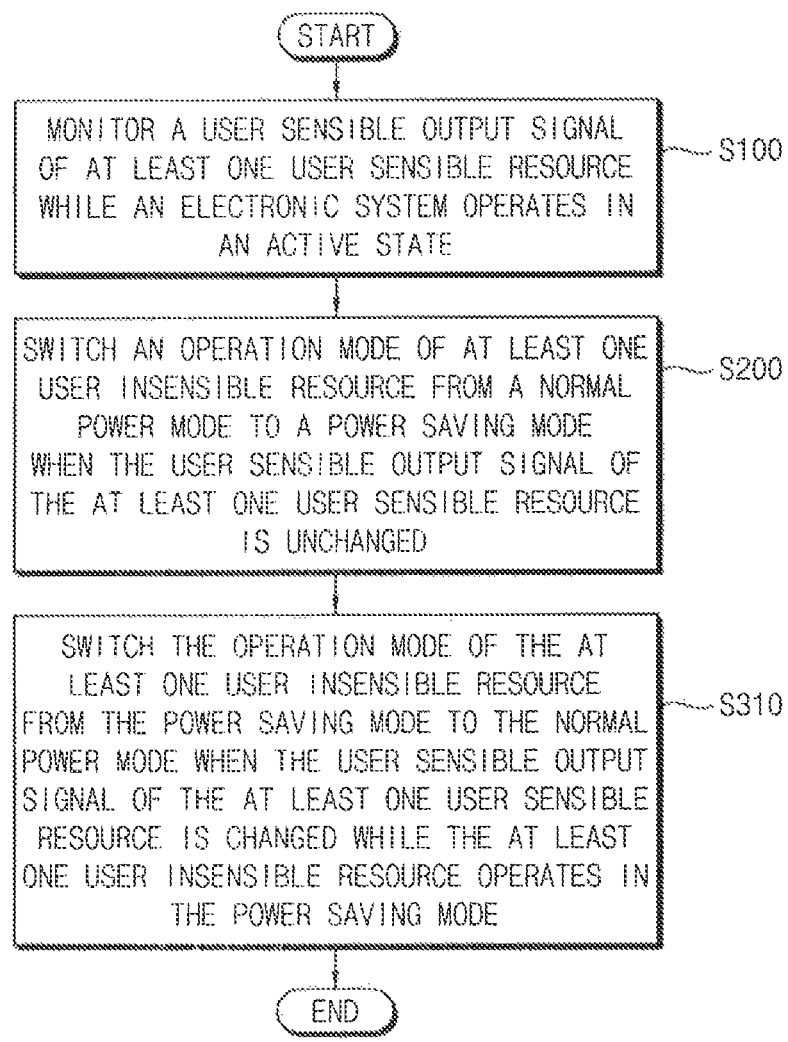
FIG. 9 is a flow chart illustrating a method of operating an electronic system according to an exemplary embodiment of the inventive concept.

FIG. 9 is a flow chart illustrating a method of operating an electronic system according to an exemplary embodiment of the inventive concept.

The method of operating an electronic system of FIG. 9 includes a step S310 that is added to the method of operating an electronic system of FIG. 1.

Referring to FIG. 9, the electronic system 10 switches the operation mode of the at least one user insensible resource 200 from the power saving mode to the normal power mode when the user sensible output signal O_S of the at least one user sensible resource 100 is changed while the at least one user insensible resource 200 operates in the power saving mode (step S310).

For example, referring to FIGS. 4 and 6, the display device 110 may deactivate the first power saving signal PSS1 when the display device 110 starts receiving the image data IDATA from the central processing unit 210 while the central processing unit 210, the memory device 220, the touch screen device 230, and the sensor 240, which correspond to the at least one user insensible resource 200, operates in the power saving mode.

Similarly, the audio device 120 may deactivate the first power saving signal PSS1 when the audio device 120 starts receiving the audio data ADATA from the central processing unit 210 while the central processing unit 210, the memory device 220, the touch screen device 230, and the sensor 240, which correspond to the at least one user insensible resource 200, operates in the power saving mode.

Similarly, the vibration device 130 may deactivate the first power saving signal PSS1 when the vibration device 130 starts receiving the vibration data VDATA from the central processing unit 210 while the central processing unit 210, the memory device 220, the touch screen device 230, and the sensor 240, which correspond to the at least one user insensible resource 200, operates in the power saving mode.

The power saving manager 300 may transition the mode signal MD from the second logic level to the first logic level to switch the operation mode of the central processing unit 210, the memory device 220, the touch screen device 230, and the sensor 240, which correspond to the at least one user insensible resource 200, from the power saving mode to the normal power mode when the power saving manager 300 receives the deactivated first power saving signal PSS1.

Figure 10:
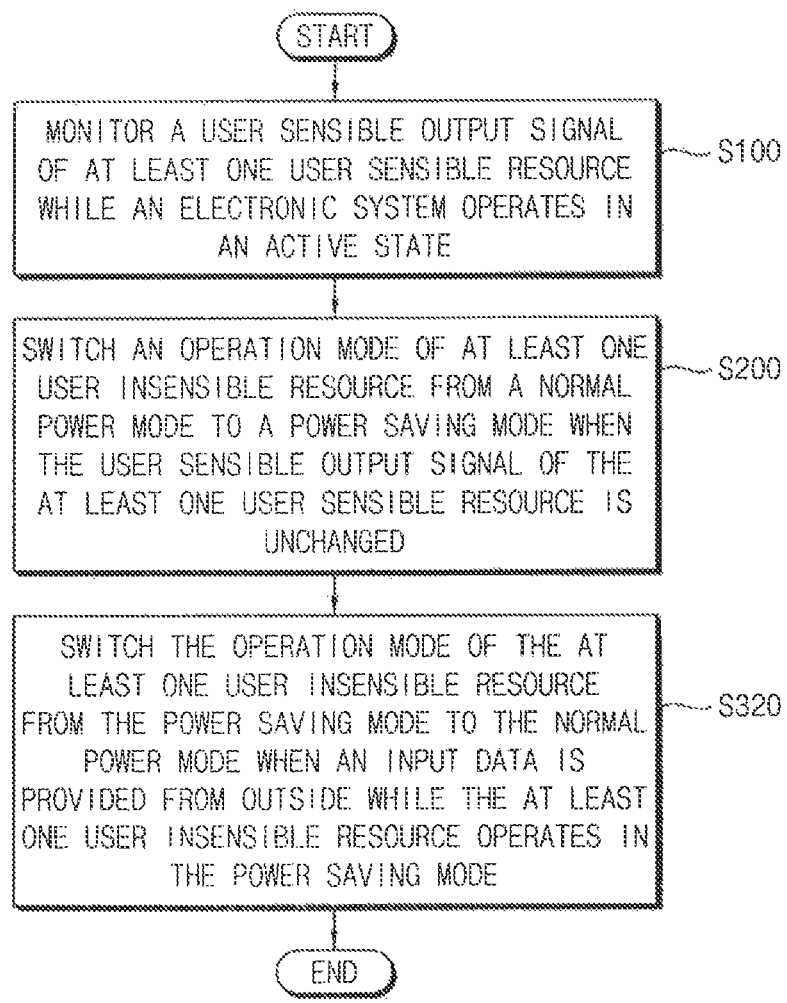
FIG. 10 is a flow chart illustrating a method of operating an electronic system according to an exemplary embodiment of the inventive concept.

FIG. 10 is a flow chart illustrating a method of operating an electronic system according to an exemplary embodiment of the inventive concept.

The method of operating an electronic system of FIG. 10 includes a step S320 that is added to the method of operating an electronic system of FIG. 1.

Referring to FIG. 10, the electronic system 10 switches the operation mode of the at least one user insensible resource 200 from the power saving mode to the normal power mode when input data is provided from outside while the at least one user insensible resource 200 operates in the power saving mode (step S320).

Figure 11:
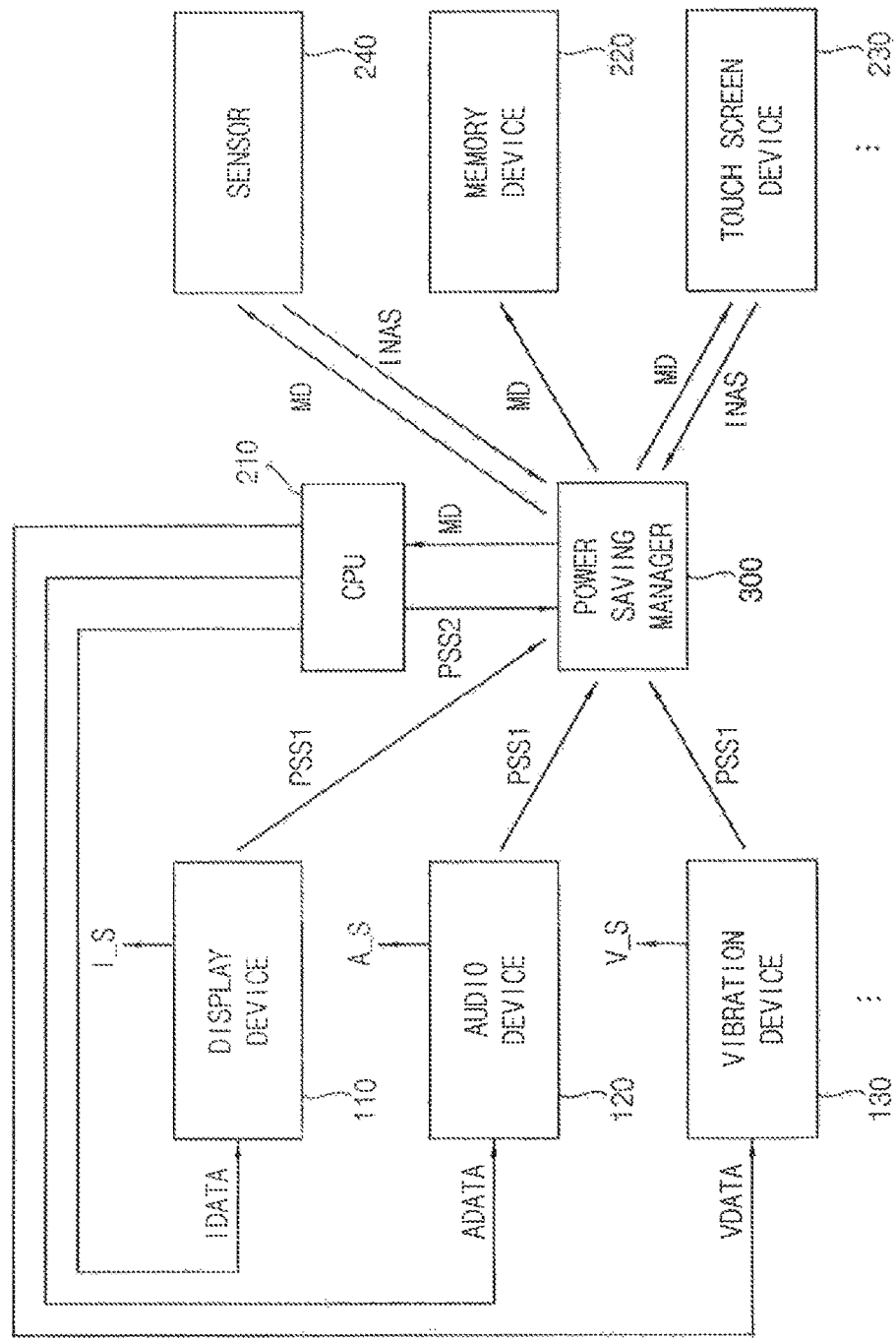
FIG. 11 is a diagram for describing a process of switching the operation mode of the at least one user insensible resource from the power saving mode to the normal power mode included that may be included in the method of operating the electronic system of FIG. 10.

FIG. 11 is a diagram for describing a process of switching the operation mode of the at least one user insensible resource from the power saving mode to the normal power mode that may be included in the method of operating the electronic system of FIG. 10.

Referring to FIGS. 10 and 11, in an exemplary embodiment, the touch screen device 230 provides an input activation signal INAS to the power saving manager 300 (e.g., a controller) when the user provides the input signal to the electronic system or device 20b through the touch screen device 230 while the at least one user insensible resource 200 operates in the power saving mode. For example, if the electronic system is currently in the power saving mode, and a user then uses a finger or a stylus to scroll to a different point in a presented window, this could cause the electronic system to switch to the normal power mode.

The power saving manager 300 may transition the mode signal MD from the second logic level to the first logic level to switch the operation mode of the central processing unit 210, the memory device 220, the touch screen device 230, and the sensor 240, which corresponds to the at least one user insensible resource 200, from the power saving mode to the normal power mode in response to the input activation signal INAS.

In an exemplary embodiment, the sensor 240 provides the input activation signal INAS to the power saving manager 300 when the sensing result of the sensor 240 is changed by more than a threshold value while the at least one user insensible resource 200 operates in the power saving mode. For example, if the electronic system is currently in the power saving mode, and a user has tilted the electronic system (e.g., a mobile device) by more than a threshold angle (e.g., its orientation has changed), this could cause the electronic system to switch to the normal power mode.

The power saving manager 300 may transition the mode signal MD from the second logic level to the first logic level to switch the operation mode of the central processing unit 210, the memory device 220, the touch screen device 230, and the sensor 240, which correspond to the at least one user insensible resource 200, from the power saving mode to the normal power mode in response to the input activation signal INAS.

Figure 12:
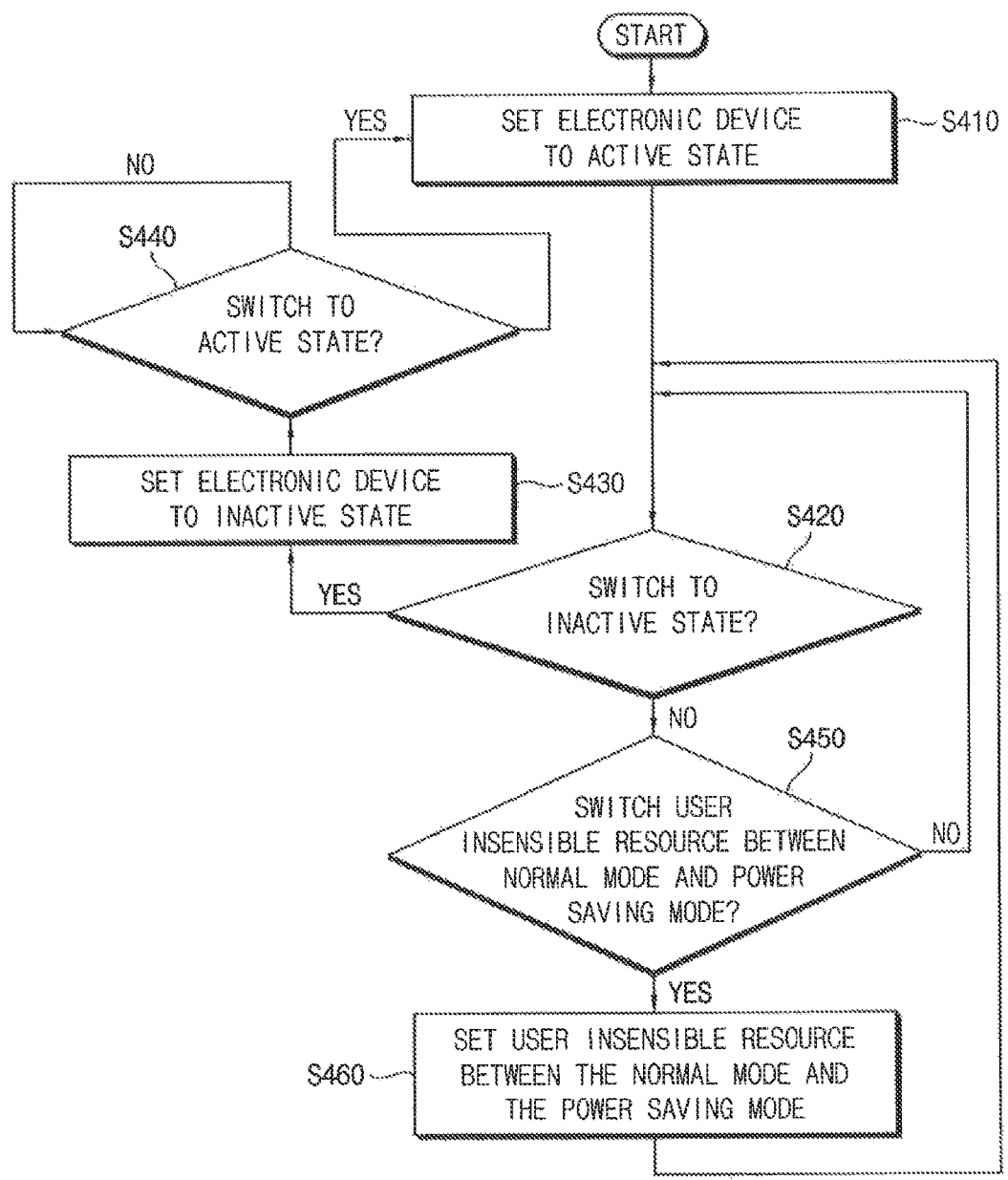
FIG. 12 illustrates a method of operating an electronic system according to an exemplary embodiment of the inventive concept.

FIG. 12 illustrates a method according to an exemplary embodiment of the inventive concept that may be performed by at least one of the above-described electronic systems 10, 10a, 20, 20a, or 20b.

Upon startup (e.g., power up) of the electronic system, the electronic system switches to the active state (S410). The electronic system is capable of performing a plurality of functions in the active state. In an embodiment, the electronic system operates at a first operating frequency during the active state. In an embodiment, the electronic system operates at a first operating voltage during the active state.

The electronic system then determines whether it should switch to the inactive state (S420). For example, if the electronic system has not performed an operation within a given period of time, the electronic system may determine that it should switch to the inactive state. For example, if a user has turned off a display panel of the electronic system by pressing a physical button, the electronic system could determine that it should switch to the inactive state.

If the electronic system determines it should switch to the inactive state, the electronic system switches to the inactive state (S430). In an embodiment, in the inactive state, the electronic system is capable of performing only a smaller subset of the functions it performs during the active state. In an embodiment, the electronic system operates at a second frequency lower than the first frequency during the inactive state. In an embodiment, the electronic system operates at a second operating voltage less than the first operating voltage during the inactive state.

After the electronic system switches to the inactive state, the electronic system continuously checks to determine whether to switch the electronic system back to the active state (S440). The electronic system may perform these checks periodically. For example, the electronic system may delay for a period of time and then perform the check, and if the check indicates the device should remain in the inactive state, the device would delay for the same period of time and then re-perform the same check. If one of these checks indicates the electronic system should switch to the active state, the method proceeds to step S410. The electronic system may determine it should switch to the active state if it determines that the electronic system needs to execute a function not supported by the inactive state. The electronic system may determine it should switch to the active state upon receipt of user feedback such as a user pressing a physical button on the electronic system.

Assuming the switch to the inactive state did not occur, the method proceeds to determine whether it should switch at least one user insensible resource between a normal power mode and power saving mode (S450). For example, if all the user insensible resources are currently set to the normal power mode, the electronic system determines whether it should switch one or more of them to the power saving mode. For example, if all the user insensible resources are currently set to the power saving mode, the electronic system may determine whether it should switch one or more of the user insensible resources to the normal power mode.

If the electronic system determines that one or more of the user insensible resources need to change to a different mode, the electronic system sets one or more of the user insensible resources between the normal mode and the power saving mode (S460). For example, if the electronic system determines it should set the user insensible resources to the power saving mode, the electronic system sets the corresponding user insensible resources to the power saving mode. For example, if the electronic system determines it should set a user insensible resource to the normal power mode, the electronic system sets the user insensible resource to the normal power mode. The method can then proceed back to S420 to re-determine whether to set the electronic system to the inactive state.

As described above with reference to FIGS. 1 to 12, in an electronic system (e.g., 10, 10a, 20, 20a, and 20b) and the method of operating the electronic system according to at least one exemplary embodiment of the inventive concept, the electronic system switches the operation mode of the at least one user insensible resource 200, such as the central processing unit 210, the memory device 220, the touch screen device 230, and the sensor 240, from the normal power mode to the power saving mode when the user sensible output signal O_S of the at least one user sensible resource 100, such as the display device 110, the audio device 120, and the vibration device 130, is unchanged during the reference time period in the active state.

Since the at least one user sensible resource 100 stops generating the user sensible output signal O_S or generates the user sensible output signal O_S having a constant magnitude in the power saving mode, the user may not notice a decrease in operation speed of the electronic system even though an operation speed of the at least one user insensible resource 200 is decreased in the power saving mode.

Therefore, an electronic system (e.g., 10, 10, 20, 20a and 20b) and the method of operating the electronic system according to at least one exemplary embodiment of the inventive concept may effectively decrease the power consumption in the active state while the user is unable to notice a decrease of the operation speed of the electronic system.

Figure 13:
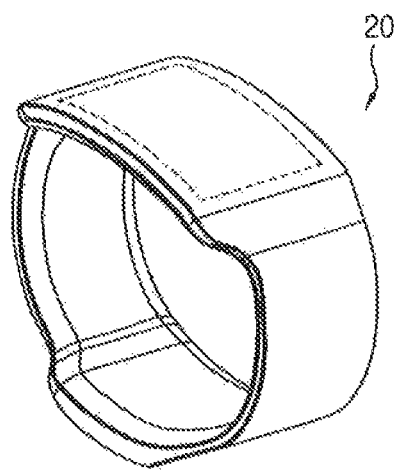
FIGS. 13 and 14 are diagrams illustrating examples of the electronic system of FIG. 4.
Figure 14:
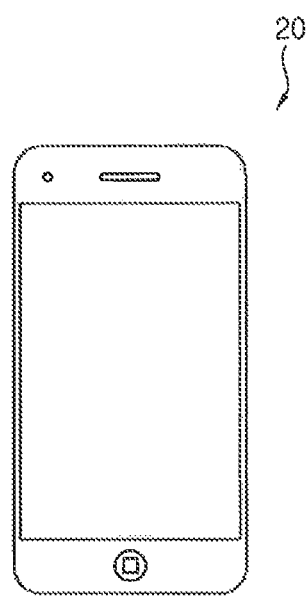

FIGS. 13 and 14 are diagrams illustrating examples of the electronic system of FIG. 4.

In FIG. 13, the electronic system 20 is implemented as a smart watch. In FIG. 14, the electronic system 20 is implemented as a smart phone. The electronic system shown in FIG. 13 and FIG. 14 may be replaced with any of the other above-described electronic systems (e.g., 10, 10a, 20a, or 20b).

As illustrated in FIGS. 12 and 13, the electronic system 20 according to an exemplary embodiment of the inventive concept may be implemented as a mobile device, such as a smart watch, a smart phone, etc. Since the mobile device operates using a battery, a usable time of the mobile device may decrease when the power consumption of the mobile device increases.

As described above, the electronic system 20 according to an exemplary embodiment may switch the operation mode of the at least one user insensible resource 200 from the normal power mode to the power saving mode when the user sensible output signal O_S of the at least one user sensible resource 100 is unchanged during the reference time period in the active state.

For example, when the user scrolls a screen of the display device 110, the user sensible output signal O_S of the at least one user sensible resource 100 changes, such that the electronic system 20 may operate the at least one user insensible resource 200 in the normal power mode. On the other hand, when the user temporarily stops scrolling a screen of the display device 110, the user sensible output signal O_S of the at least one user sensible resource 100 is unchanged, such that the electronic system 20 may operate the at least one user insensible resource 200 in the power saving mode.

Therefore, the electronic system 20 according to an exemplary embodiment may effectively decrease the power consumption in the active state while the user is unable to notice a decrease in operation speed of the electronic system 20.

The above-described methods may be tangibly embodied on one or more computer readable medium(s) (i.e., program storage devices such as a hard disk, magnetic floppy disk, RAM, ROM, CD ROM, Flash Memory, etc., and executable by any device or machine comprising suitable architecture, such as a general purpose digital computer having a processor, memory, and input/output interfaces.

The foregoing is illustrative of exemplary embodiments of the present inventive concept. Although a few exemplary embodiments have been described, those skilled in the art will readily appreciate that many modifications are possible in the exemplary embodiments without materially departing from the present inventive concept. Accordingly, all such modifications are intended to be included within the scope of the present inventive concept.

What is claimed is:

1. An electronic system comprising:
a first device configured to generate an output signal in response to current input data and generate a power saving signal based on the current input data, wherein the output signal is perceivable using a physiological sense;
a second device; and
a controller configured to switch the electronic system into one of an inactive state and an active state, operate the second device during the active state in a power saving mode when the power saving signal is activated, and operate the second device during the active state in a normal power mode when the power saving signal is deactivated.

2. The electronic system of claim 1, wherein the electronic system is capable of performing a set of functions during the active state and the electronic system is only capable of performing a smaller subset of the set of functions during the inactive state.

3. The electronic system of claim 1, wherein the second device performs a polling operation at a first frequency during the normal power mode, and perform the polling operation at a second frequency during the power saving mode, and the first frequency is greater than the second frequency.

4. The electronic system of claim 1, wherein a first period between successive polling operations performed by the second device during the normal power mode is less than a second period between successive polling operations performed by the second device during the power saving mode.

5. The electronic system of claim 1, wherein the first device activates the power saving signal when the first device has not received the current input data within a reference period, and otherwise deactivates the power saving signal, wherein the first device is configured to adjust the reference period in response to a power control signal from the controller.

6. The electronic system of claim 1, wherein the first device activates the power saving signal when the current input data is identical to previous input data and otherwise deactivates the power saving signal.

7. The electronic system of claim 1, Wherein the second device is a sensor configured to determine an orientation of the system, wherein the sensor is configured to send an input signal to the controller when the sensor determines the orientation has changed by more than a threshold and the controller switches the sensor to the normal power mode in response to the input signal.

8. The electronic system of claim 1, wherein the second device is a touch screen device, wherein the touch screen device sends an input signal to the controller in response to a touch sensed by the touch screen device, and the controller switches the touch screen device to the normal power mode in response to the input signal.

9. An electronic system, comprising:
a first device subsystem, wherein each device of the first device subsystem is configured to generate an output signal in response to current input data and generate a first power saving signal based on the current input data, wherein each output signal is perceivable using a physiological sense;
a second device subsystem; and
a controller configured to switch the electronic system into one of an inactive state and an active state and operate the second device subsystem during the active state in one of a power saving mode and a normal power mode based on the first power saving signals.

10. The electronic system of claim 9, wherein the controller comprises a central processing unit configured to provide the current input data to the first device subsystem.

11. The electronic system of claim 9, wherein the controller operates the second device subsystem in the power saving mode only when all of the first power saving signals are activated, and otherwise operates the second device subsystem in the normal operating mode.

12. The electronic system of claim 9, wherein the controller operates the second device subsystem in the power saving mode when at least one of the first power saving signals are activated, and otherwise operates the second device subsystem in the normal operating mode.

13. The electronic system of claim 9, wherein a device of the first device subsystem activates its first power saving signal when it has not received the current input data within a reference period and otherwise deactivated its first power saving signal, wherein the device of the first device subsystem adjusts the reference period in response to a power control signal from the controller.

14. The electronic system of claim 9, wherein a device of the first device subsystem activates its first power saving signal when the current input data is identical to previous input data and otherwise deactivates its power saving signal.

15. The electronic system of claim 9, wherein a first period between successive polling operations performed by a device of the second device subsystem during the normal power mode is less than a second period between successive polling operations performed by a device of the second device subsystem during the power saving mode.

16. A method of operating an electronic system, the method comprising:
determining, by a controller of the electronic system, whether an operating mode of the electronic system is in one of an active state or an inactive state;
upon determining the operating mode is in the active state,
generating, by a first device of the electronic system, an output signal perceivable using a physiological sense;
outputting, by the first device, a power saving signal to a controller of the electronic system;
operating, by the controller, a second device of the electronic system in a power saving mode when the power saving signal is activated; and operating, by the controller, the second device in a normal power mode when the power saving signal is deactivated.

17. The method of claim 16, wherein the electronic system is configured to perform a set of functions during the active state and only performs a smaller subset of the functions during the inactive date.

18. The method of claim 16, wherein the outputting comprises the first device activating the power saving signal when the first device has not received the current input data within a reference period and otherwise deactivating the power saving signal.

19. The method of claim 18, further comprising the first device adjusting the reference period in response to a power control signal from the controller.

20. The method of claim 16, wherein the outputting comprises the first device activating the power saving signal when the current input data is identical to previous input data and otherwise deactivating the power saving signal.

* * * * *